United States Patent Office 3,746,528
Patented July 17, 1973

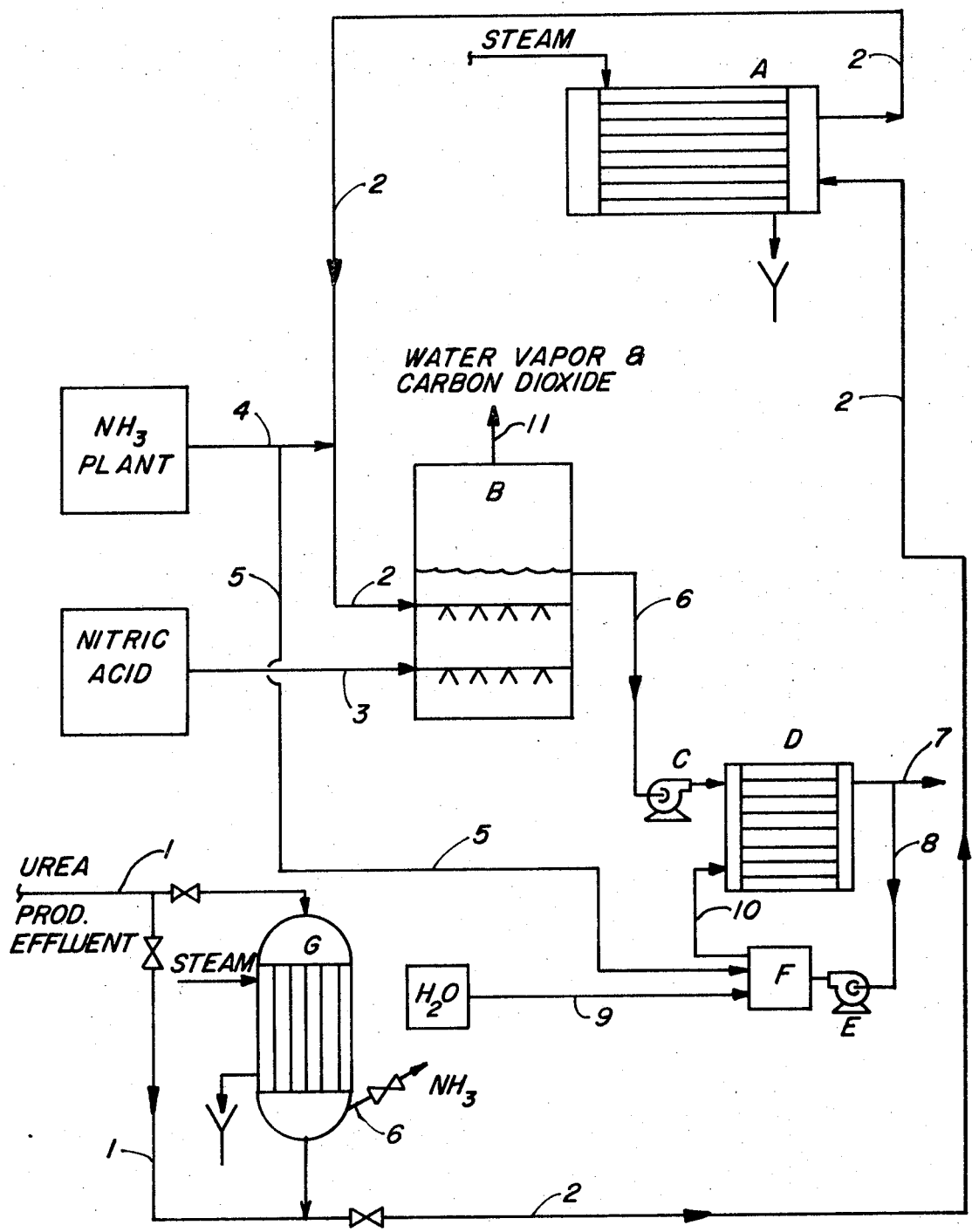

3,746,528
UTILIZATION OF UREA PRODUCTION EFFLUENTS
Edward Robert Johnson, Hopewell, Va., assignor to Allied Chemical Corporation, New York, N.Y.
Filed Apr. 20, 1971, Ser. No. 135,679
Int. Cl. C05c 9/00
U.S. Cl. 71—30
1 Claim

ABSTRACT OF THE DISCLOSURE

A crude effluent from urea production containing urea, carbon dioxide, ammonia and water is injected into a neutralizer where it is reacted with nitric acid at about 125–175° C. to form a marketable urea-ammonium nitrate fertilizer solution. The pH conditions in the neutralizer must be carefully controlled to avoid excess hydrolysis of the urea. A significant portion of the water in the effluent is vaporized by the heat of reaction of nitric acid and ammonia. If desired, product ratio of ammonium nitrate to urea may be adjusted by adding ammonia to the system or driving off part of the ammonia from the urea production effluent.

BACKGROUND OF THE INVENTION

This invention relates to fertilizer process effluents and, in particular, effluents from the production of urea. More particularly, this invention relates to the direct utilization of urea plant reactor effluents to produce marketable urea-ammonium nitrate fertilizer solutions.

Urea is normally produced in commercial practice by the reaction of ammonia with carbon dioxide. The basic reactions involved in urea synthesis are reversible:

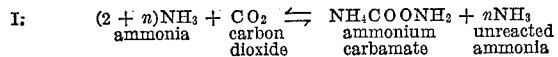

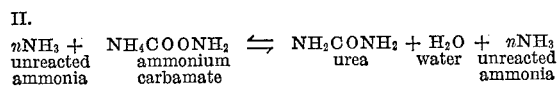

Thus, urea plant reactor effluent contains significant amounts of urea, carbon dioxide, ammonia, and water.

In accordance with commercial urea processes, it is necessary to provide equipment for vaporizing and separation of the ammonia and carbon dioxide from the urea and piping to handle the separated off-gases. Moreover, the aforesaid vaporization of ammonia subjects the urea to conditions favoring biuret formation and hydrolysis according to the following reactions.

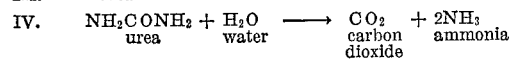

When urea production effluent is converted into fertilizer solutions containing ammonium nitrate by known processes, the ammonia is first vaporized and set to an ammonium nitrate production plant. The essentially ammonia-free urea is then sent to a mixing unit where it is mixed with ammonium nitrate and water to form product urea-ammonium nitrate solutions.

It is an object of this invention to provide a process for direct use of urea production effluents to produce urea-ammonium nitrate fertilizer solutions without separation of ammonia from the effluents.

It is another object of the invention to eliminate need for equipment to vaporize and separate ammonia from urea production effluents as well as piping required to handle said ammonia.

It is a further object to reduce the previously noted urea-degrading reactions involving hydrolysis of urea and formation of biuret.

These and other objects of this invention will become apparent from the following description and claims.

SUMMARY OF THE INVENTION

In accordance with the present invention, I provide a process for the production of an aqueous urea-ammonium nitrate fertilizer solution, which may contain free ammonia, if desired, from a crude urea production effluent containing urea, carbon dioxide, ammonia and water. Briefly stated, the instant process comprises:

(a) Injecting the urea production effluent into a neutralization zone operated at a temperature of about 125° to 175° C.;

(b) Injecting sufficient aqueous nitric acid into the neutralization zone to react with a major portion of the ammonia in the urea production effluent;

(c) Maintaining the reaction mixture in violent agitation and at a pH above about 6.5 whereby hydrolysis of the urea is substantially avoided;

(d) Separating water vapor and carbon dioxide off-gases from the reaction mixture; and (e) Recovering aqueous urea-ammonium nitrate fertilizer solution from the neutralization zone.

BRIEF DESCRIPTION OF THE DRAWING

The accompanying drawing diagrammatically illustrates a preferred method of carrying out the operation of the present invention.

DESCRIPTION OF THE PREFERRED EMBODIMENT

Referring to the drawing, effluent from urea production containing urea, carbon dioxide, ammonia and water is introduced into the system through line 1 into line 2. Alternatively, if desired, a portion of the ammonia may be removed from the aforementioned effluent in vaporizer G. The effluent flows through line 2 and preheater A to neutralizer B where the ammonia content is neutralized to ammonium nitrate by nitric acid fed to neutralizer B through line 3. If desired, additional ammonia may be added to the system through line 4. The aqueous urea-ammonium nitrate solution formed in neutralizer B is fed to pump C through line 6 and is pumped through D by pump C. If desired, free ammonia and water may be added to mixer F through lines 5 and 9, respectively, and product solution is recirculated through line 8, mixer F, line 10 and cooler D by pump E. The final cooled product passes to storage through line 7. Gases vented from neutralizer B through line 11 are normally sent to a vent condenser, not shown, but this is not essential to practicing the invention.

Feed to the process of this invention is withdrawn from a urea reactor or from urea reactor downstream equipment of a conventional process for synthesis of urea from ammonia and carbon dioxide, prior to complete separation of the free ammonia from the urea. Depending upon the analysis of the fertilizer solution desired, it may be necessary to remove a portion of the unconverted ammonia from the urea production effluent or to add ammonia in order to adjust the ratio of ammonia and ammonium nitrate to urea in the product solution. Equipment for driving off a portion of the unconverted ammonia is normally available in commercial urea plants.

The urea production effluent and the aqueous nitric acid are injected continuously into the neutralizer where ammonium nitrate is formed at about 125° to 175° C. The neutralizer is preferably operated at about 125° to 140° C. at about 1 to 3 atmospheres absolute. Desirably, a relatively low pressure is maintained in the neutralizer to facilitate violent ebullition, whereby local high concentrations of nitric acid in the neutralizer are avoided. It is also preferred that the amount of nitric acid fed to the neutralizer be suitably controlled so that the pH of the reaction mixture is maintained in the range 6.5 to 7.5. When these conditions are maintained, there is little or no hydrolysis of the urea during the ammonia neutralization reaction.

For most marketable urea-ammonium nitrate fertilizer solutions, the excess water in the urea production effluent is vaporized in the neutralizer by the heat of reaction of nitric acid and ammonia. For higher strength solutions, excess water may be removed by passing the urea production effluent through a steam heated vaporizer or preheater before sending the stream to the neutralizer, thereby adding the supplemental heat required.

In many older urea production plants about 15% to 40% of the carbon dioxide feed to the reactor is unconverted to urea and normally is vented to the atmosphere. However, urea processes are now available wherein only about 5% to 15% of the carbon dioxide feed to the reactor is unconverted to urea. For optimum benefits, the instant invention is operated with use of a urea production effluent that is relatively low in carbon dioxide. Furthermore, the commercial significance of increased carbon dioxide utilization in urea production can be appreciated from the fact that low cost ammonia is now available from transcontinental pipeline, and in plants employing ammonia fixation with carbon dioxide the degree of utilization of carbon dioxide has become increasingly important.

In accordance with one preferred embodiment of the present invention, the urea production effluent is derived from a process for production of urea by synthesis of ammonia and carbon dioxide at a temperaure of about 150° to 200° C. and at a pressure of 2000 to 4000 p.s.i.g., with a very high overall carbon dioxide conversion of about 90 to 95% in the reactor. Typical composition of said preferred urea production effluent is 1 to 3 weight percent carbon dioxide, 31 to 53 weight percent ammonia, 10 to 16 weight percent water, and 35 to 52 weight percent urea. It will be understood that urea production effluents containing relatively larger amounts of carbon dioxide may be used in the instant process; however, conservation of carbon dioxide is considered highly desirable.

The neutralizer vessel is normally constructed of stainless steel, preferably austenitic chromium-nickel stainless steel. However, the cooled product solution may be handled in mild steel provided a corrosion inhibitor is added. Various corrosion inhibitors have been suggested including water-soluble phosphates, triocyanates, borates, arsenates and arsenites. Ammonium phosphate corrosion inhibitors are preferred for solutions having a pH of about 6.5 to 8.2; I prefer to incorporate in these solutions between about 0.03% and 0.04% by weight of $P_2O_5$ in the form of an aqueous ammoniated superphosphoric acid solution having a total nitrogen content of 9–12% and a total phosphate content, measured at $P_2O_5$ of 28–39%, by weight. This corrosion inhibitor may be added to the reaction mixture in the neutralizer or to the product prepared therein. Micronutrients may also be added to the product if desired.

The following examples are illustrative of the invention. In these examples the amounts of materials given in parts or percentages are by weight.

EXAMPLE 1

The neutralizer vessel consisted primarily of a vertical stainless steel pipe 36 inches in diameter and 20 feet tall. The neutralizer contained spargers near the base for seprate addition of aqueous nitric acid and urea production effluent. Liquid level in the neutralizer vessel was maintained at about 7 feet by means of an overflow pipe from which neutralizer product solution was removed. An entrainment separator consisting of stainless steel mesh was installed near the top of the neutralizer. A portion of the nitric acid feed may be sprayed onto the entrainment separator to neutralize any ammonia in the off gases. The off gases were removed by means of a vent pipe at the top of the neutralizer.

After operating the system as shown in FIG. 1 for 80 hours continuously to assure system equilibration and steady state conditions, the following test data were taken:

Referring to FIG. 1, urea production effluent at 143° C. and a pressure of 1000 p.s.i.g. was reduced in pressure to 10 p.s.i.g. and fed through line 1 to a conventional steam-heated vaporizer G at a rate of 170 pounds per hour. Feed of the individual components was as follows:

| Component: | Weight percent |
|---|---|
| $CO_2$ | 1.8 |
| $NH_3$ | 31.2 |
| $H_2O$ | 15.5 |
| Urea | 51.5 |

In vaporizer G, operating at 125° C., 48–50% of the ammonia was vaporized and removed from the system through line 6. The vaporized ammonia was sufficiently pure to be utilized for production of nitric acid, if desired. The liquor from vaporizer G, which contained the urea and most of the water and unconverted carbon dioxide from the urea reactor, plus the remaining unconverted ammonia to be neutralized by nitric acid, was passed through line 2 to a conventional steam-heated preheater A. Preheater A was operated using supplemental steam supplying additional heat so that the product would have the desired water content. (Optionally, heat transfer surface may be installed in neutralizer B.) Material from preheater A flowed through line 2 to neutralizer B where sufficient 57% aqueous nitric acid was added through line 3 to neutralize all of the free ammonia to ammonium nitrate. The pH of the reaction mixture in neutralizer B was maintained at about 6.5 to 7.5 by controlling the rate of nitric acid being fed. Pressure in neutralizer B was maintained at near atmospheric, whereby violent ebullition occurred so that the pH of the reaction mixture was essentially the same throughout the mixture. Water vapor and carbon dioxide were vented through line 11. The product solution was removed from neutralizer B via line 6 and was pumped through a conventional cooler D by pump C. The product solution at 35° C. was conveyed to storage by line 7. The product solution had the following composition:

| Component: | Weight percent |
|---|---|
| Urea | 34.3 |
| Ammonium nitrate | 45.6 |
| $H_2O$ | 20.1 |

Since the product was stored in carbon steel tanks, a corrosion inhibitor was added consisting of about 0.03 to 0.04% by weight of $P_2O_5$ in the form of an aqueous ammoniated superphosphoric acid solution having a total nitrogen content of 10.2% and a total phosphate content measured as $P_2O_5$, of 34.2% by weight.

EXAMPLE 2

The procedure of Example 1 was followed except that vaporizer G was bypassed, i.e., the urea production effluent was reduced in pressure to 10 p.s.i.g. and passed directly from line 1 into line 2. Sufficient nitric acid was fed through line 3 so that the reaction mixture in neutralizer B was maintained at pH 6.5 to 7.5. Product solution was similar to the product of Example 1 except that the weight ratio of ammonium nitrate to urea was increased to about 2.67.

EXAMPLE 3

The procedure of Example 2 was followed except that ammonia was added through line 5 to mixer F and product solution was recirculated through line 8, mixer F, line 10 and cooler D by pump E. Sufficient ammonia was added to give a product solution containing about 28% free ammonia. Product composition was:

| Component: | Weight percent |
|---|---|
| $NH_3$ | 28.0 |
| Ammonium nitrate | 40.0 |
| Urea | 15.0 |
| Water | 17.0 |

EXAMPLE 4

The procedure of Example 3 was followed except that ammonia was also added to the system through line 4, sufficient ammonia being added through line 4 to increase the weight ratio of ammonium nitrate to urea in neutralizer B to about 4.17. The resulting product had the following composition:

| Component: | Weight percent |
|---|---|
| $NH_3$ | 26.0 |
| Ammonium nitrate | 50.0 |
| Urea | 12.0 |
| Water | 12.0 |

EXAMPLE 5

In a comparative test, Example 1 was repeated but the amount of nitric acid fed to neutralizer B through line 3 was varied somewhat to determine the effect of reaction pH on rate of hydrolysis of urea at 125 to 175° C. Urea hydrolysis increased rapidly with increasing temperature under acidic (pH 4–6) conditions; however, urea hydrolysis was not significant above pH 6.5 for normal holdup times in the neutralizer. At reaction temperature of 140° C., when pH in the neutralizer was increased from 6.5 to 8.2 no significant change in urea hydrolysis was noted, but considerable ammonia odor was noted in the off gases from neutralizer B at pH 8.2. Therefore, preferred pH conditions in neutralizer B are about 6.5 to 7.5. These pH conditions are readily maintained by controlling the rate of nitric acid feed to the neutralizer.

I claim:
1. A process for production of an aqueous urea-ammonium nitrate fertilizer solution from a urea production effluent containing on a weight basis about 1% to 3% carbon dioxide, 31% to 53% ammonium, 10% to 16% water and 35% to 52% urea, which comprises:
    (a) continuously decreasing the ammonia to urea ratio in the urea production effluent by vaporization of part of the ammonia from the effluent;
    (b) continuously injecting the urea production effluent with reduced ammonia content into a neutralization zone;
    (c) continuously injecting sufficient aqueous nitric acid into the neutralization zone to react with essentially all of the ammonia in said urea production effluent;
    (d) maintaining the reaction mixture in said neutralization zone in violent agitation at a temperature of 125° C. to 140° C., at a pH of 6.5 to 7.5, and at a pressure of 1 to 3 atmospheres absolute, whereby water and carbon dioxide are volatilized and hydrolysis of the urea is substantially avoided;
    (e) continuously separating water vapor and carbon dioxide off-gases from the reaction mixture; and
    (f) continuously recovering aqueous urea-ammonium nitrate fertilizer solution from the neutralization zone.

References Cited
UNITED STATES PATENTS

| 2,046,827 | 7/1936 | Lawrence et al. | 260—555 A X |
| 3,144,321 | 8/1964 | Butikofer | 23—103 X |
| 2,739,036 | 3/1956 | Kamenjar et al. | 23—103 |
| 2,549,430 | 4/1951 | Crittenden | 71—30 |
| 2,855,286 | 10/1958 | Harvey | 71—29 |
| 2,167,464 | 7/1939 | Rodgers et al. | 23—103 |
| 3,573,173 | 3/1971 | Otsuka | 260—555 A |

SAMIH N. ZAHARNA, Primary Examiner

R. BARNES, Assistant Examiner